Patented Feb. 6, 1923.

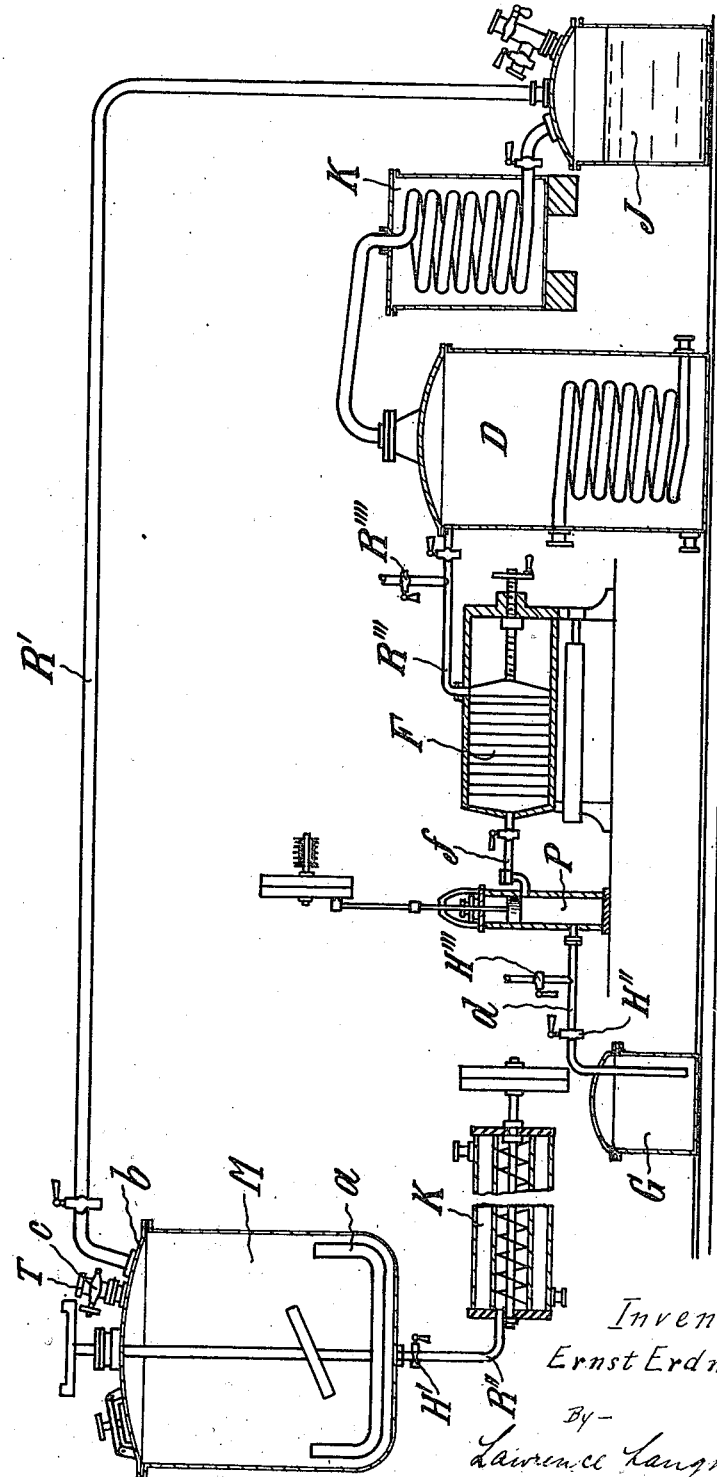

1,443,983

UNITED STATES PATENT OFFICE.

ERNST ERDMANN, OF HALLE-ON-THE-SAALE, GERMANY.

PROCESS FOR OBTAINING PARAFFIN AND HIGHLY-VISCOUS LUBRICATING OILS FROM BITUMINOUS MASSES.

Application filed April 20, 1921. Serial No. 462,979.

*To all whom it may concern:*

Be it known that I, Professor Dr. ERNST ERDMANN, citizen of the German Republic, residing at Halle-on-the-Saale, Province of Saxony, Germany, have invented new and useful Improvements in and Relating to a Process for Obtaining Paraffin and Highly-Viscous Lubricating Oils from Bituminous Masses (for which I have filed applications in Germany Jan. 22, 1918; Mar. 22, 1918; Aug. 5, 1918; and Sept. 2, 1919), of which the following is a specification.

The usual process for obtaining paraffin from paraffin-containing lignite-tar, coal-tar, or shale-tar and the like, commences with a fractional distillation of all the tar. The fraction which is rich in paraffin is then crystallized by cooling and the paraffin which is separated from the oil is purified by a pressing process with the aid of gasoline or by the so-called sweating process.

As the boiling temperature of the paraffin hydrocarbons is very high and the tar must be exposed, even when using a high vacuum during distillation, to a heat of over 300° C. in order that all volatile components may be driven off, there will be, as is shown by the formation of preceptable quantities of distillation gases, a partial disintegration of the liquid and solid tar components. The consequence of this is a reduction of the yield of paraffin and a deterioration in the quality of the mineral oils. The costs of the distillation process are also high.

It has now been discovered that acetone is a medium for completely separating the paraffin from the tar without distillation, while the liquid components of the lignite-tar or shale tar remain in solution therein. Cold will assist the separation. The paraffin, which has separated out, can easily be isolated from the oil by filtration, pressing and washing.

Acetone as a precipitating means is very much better than other means previously suggested for the same purpose, such as alcohol, hydrocarbons of the aliphatic and aromatic series and chlorinated hydrocarbons on account of the fact that it very easily dissolves all the oleaginous tar components, even at a low temperature, while the paraffin separated out is quite insoluble, even in the presence of the tar oils.

The acetone can be added directly to the tar, in which case the acetone required will be about twice the volume of the tar. It will be found to be of greater advantage first of all to distil off all the more volatile components from the tar and to utilize the residue for obtaining the paraffin. The process is carried out, for instance, in the following manner:—

1000 kg. lignite-tar obtained by the dry distillation process or by the producer process are treated with superheated water vapour of 200° C. to 250° C., until 700 kg. of oil have been distilled. The residue amounting to 300 kg. is mixed, after cooling, with 700 ltr. of acetone and cooled to about 0° C. After 24 hours the paraffin, which has separated out, is filtered off through a filter press and washed with acetone. By a still further cooling to —20° C. a soft paraffin amounting to a further 1 to 1½% of the tar may be obtained from the mother lye. The acetone is driven off by distillation from the liquors obtained from the above filtrations.

The raw paraffin thus obtained may be used directly for many purposes. In order to refine it, it is dissolved in an indifferent solvent, for instance in the oil blown off from the tar by means of superheated water vapour and the solution is treated with concentrated sulphuric acid. Sulphuric acid amounting to about 5% of paraffin used will be sufficient. After a thorough mixing it is allowed to settle, the solution is isolated from the acid resins, the former is washed with water, after being neutralized with soda lye and is precipitated with acetone. In this manner paraffin suitable for the manufacture of candles is obtained.

In place of acetone methyl-ethyl ketone can be used.

In this manner very viscous lubricating oils may be obtained from the raw tar or from the tar freed from the volatile components, by driving off, after removing the paraffin by precipitation with acetone, the light oils more or less completely with superheated water vapour at about 200—250° C, without external heating over an open fire. In the known processes of working up lignite-tar or shale-tar lubricating oils are obtained only in small quantities, the quality not being particularly good. The reason for this is not, as has been ascertained, that suitable oils are not present in the said tars, but that these oils are to a great extent decomposed by the heating to a high temperature, which the tar undergoes when being distilled on a manufacturing scale and are robbed of their viscous properties.

Owing to the fact that the lubricating oils are obtained without subjecting the tar to an excessive temperature, i. e., without distilling the lubricating oils themselves, oils of very high viscosity are obtained, the yield being considerable. The tar is freed of paraffin by the addition of an indifferent volatile precipitating means, such as acetone or acetic ether and by cooling and filter pressing the paraffin from the oleaginous filtrate. The volatile precipitating means is removed from the dissolved oil by distillation with or without saturated steam and the residue of oil is treated with superheated steam at about 200° C. to 250° C. The volatile oil, which passes over, is suitable as oil for motive purposes. As a residue there remain lubricating oils of high viscosity, which, within certain limits, may be increased at will by the time taken in driving off the volatile oil with superheated steam.

It may be stated that the two operations, paraffin separation and the driving off of the volatile oil, for motive purposes, from the lubricating oils can be carried out in the reverse order. Less precipitating means are used if the tar is first at least partially freed from the volatile oils, then deparaffined in the manner above described. After the precipitating means has been separated from the paraffin the driving off of volatiles by means of superheated steam is continued until the required viscosity of the residual lubricating oils is obtained.

For this process lignite-tar is suitable, which has been obtained by the dry distillation process or by the producer process.

Example 1.

1000 ltr. of lignite-tar are mixed with 2000 ltr. of acetone, being stirred the whole time and cooled to below 0° C. After 24 hours the mass is pumped through a filter press and washed with acetone. From the filtration the acetone is recovered by distillation. The oil is thereupon treated with superheated steam at 250° C. until about 600 ltr. of motor oil have passed over. A lubricating oil having free viscous properties remains. The yield in lubricating oil amounts to 30% of the deparaffined tar and has a flashing point of 207° C. and a viscosity of 17.6 Engler degrees.

Example 2.

1000 ltr. of producer tar from lignite are first treated with superheated steam until 300 ltr. of fuel oil have passed over. The residual oil is freed from paraffin by the addition of 1000 ltr. of acetone, as in example 1. After distilling off the acetone there remains a lubricating oil, the viscosity of which can be still further increased by further driving off of volatiles with superheated steam at 250° C. The yield of viscous lubricating oil amounts to 40% of the tar used and has a flashing point of 210° C.

Instead of treating the deparaffined tar with superheated steam to free it of the very volatile oils, it may be heated in a vacuum at a temperature below 250° C. By this means, the valuable viscous oils remain undisintegrated, while, when the lignite-tar is distilled in a manner usually adopted in the mineral oil industry at a pressure of 400 to 500 mm. of mercury, they are almost entirely disintegrated.

It was found, that the result is a different one, if tars or mineral oils are treated, instead of with pure acetone, with a thin aqueous solution of acetone. In such a solution practically only the phenol-like components of the tars and mineral oils, generally termed creosote oils, are dissolved. Hence the aqueous acetone solution provides a means for extracting these creosote oils and isolating them from viscous oils, oil for motive purposes and paraffin. This is of importance more especially for the manufacture of good lubricating oils as lubricating oils containing creosote are useless for technical purposes or are at least inferior.

With a similar object in view it has already been proposed to work up lignite tar or producer tar from lignite or coal by extraction with a quantity of strong alcohol that is insufficient for completely dissolving the tar. Acetone diluted with water has great advantages as compared with 90 to 95% alcohol, on account of its much lower price on the one hand and on the other hand on account of the fact that acetone mixed with water makes it possible to obtain a far greater isolation of the creosote oils from the other tar or mineral oil components. These other components are not insoluble in alcohol, but only less soluble than creosote oil. In the case of acetone, on the other hand, the amount of water to be added can be so gauged so that no part whatever of the valuable viscous oils and motive oils enters into solution. The amount of water to be added depends on the nature of the raw material. The most suitable percentage of water for the creosote solution obtained may vary between 25 and 65% and should be ascertained by preliminary experiments.

When carrying out the extraction, viscous tar will be preferably slightly warmed. The procedure is, for instance, such that raw lignite tar obtained by dry distillation is washed with an equal quantity of an aqueous acetone solution containing 50% acetone in a washing column at 40° C. The layers are then separated, and each is freed independently from acetone by means of a distilling column and worked up further in a known manner. The recovered acetone is used over again in the process.

In a similar manner all other kinds of tar can be extracted, such for instance as shale tar, peat tar, coal tar, low temperature tars and producer tars. The important point, however, is, as already stated, to add the right amount of water to the acetone, taking into account the amount of water that the raw tar may itself contain. Thus producer tars frequently consist of oil emulsions with considerable quantities, up to 25% of water. They need not be de-watered when being worked up by the process described, which is of considerable advantage for the reason that the de-watering entails considerable technical difficulties, as is well known. It is only necessary to determine beforehand the percentage of water and to deduct it from the amount of water to be added to the acetone.

Similarly all kinds of tar distillates and distillation residues, as well as separate fractions of the working up of tars and mineral oils, can be extracted, care being taken to add sufficient water to cause the creosotes to pass into solution, but not so little that the viscous oils or motive oils dissolve to any extent.

The process may also be carried out in the following manner: An extract of the tars or mineral oils, obtained in a known manner with pure acetone, is mixed with such a quantity of water or aqueous acetone solution that the motive oils and viscous oils settle, while the creosotes remain in solution. The settled oil may be washed with an aqueous acetone solution, then freed from acetone by distillation and further worked up in a known manner.

Further experiments have shown, that peat tar is particularly suitable as a primary material for the same purpose. The latter should preferably be removed from the tar beforehand. This can be done by extraction with a suitable solvent, for instance dilute alcohol or dilute acetone. In this case the final product will be lubricating oils, which are not only free from paraffin, but are also free from creosote oil.

The main advantages of this process are first, that it allows of the profitable utilization of a starting material, which has hitherto been little regarded and been looked upon as of little value; and second, that the lubricating oils obtained by this process from peat tar are low in sulphur and free from any strong odor, and are therefore still more valuable for this reason than those obtained from lignite tar or shale tar.

*Example 1.*

1000 kg. of peat tar are mixed with 1000 kg. of acetone in a cold state and are cooled to below 0° C. Thereupon the precipitate, which has separated out, is filtered through a suction filter and washed with acetone. The acetone is recovered by distillation from the filtrate. The residual oil is thereupon treated in a still with superheated steam at 250° C. until the more volatile motive oil has passed over and the lubricating oil remaining in the still has the required viscosity.

*Example 2.*

1000 kg. of peat tar are freed from paraffin, as in example 1, by precipitation with acetone and by filtering. In order to remove the creosote oils as well the acetone extract of the tar the solution is passed through a washing column, in which it is washed with 2250 kg. of a 23% aqueous acetone solution. The creosote passes into the aqueous acetone solution.

The acteone in solution is distilled from the washed oil and the more volatile oil is thereupon driven off with superheated steam at 250° C. until the residual lubricating oil has acquired the desired viscosity.

Acetone actually excels the other precipitating means already proposed, such as alcohol, hydrocarbons of the aliphatic and aromatic series as well as chlorinated hydrocarbons by very readily dissolving all the oleaginous tar compounds even at a low temperature, while it separates off the paraffin in an entirely insoluble state, even in the presence of the tar oils. In spite of this, when carrying out the process in practice, considerable difficulties are met with, as extended experiments have shown. These difficulties are caused by the high volatility of acetone even at ordinary temperatures. At the relatively high price of acetone it can only be used commercially for obtaining paraffin, if the losses by evaporation are reduced to a minimum.

This difficulty can be obviated by using a system which is entirely closed to the outer air, for preventing evaporation of the acetone, instead of employing open apparatus to obtain the paraffin, such as has heretofore been employed in the crystallization and pressing process. The closed mixing vessel, crystalizer, filter press, and distilling apparatus employed in the process form a hermetically closed system, within which the acetone travels in a closed circuit without coming into contact with the outer air, and thus being able to evaporate.

In the accompanying drawing an example of an arrangement for carrying out the process is shown diagrammatically in cross section.

M is the mixing vessel provided with stirring means *a*, in which the tar is mixed with acetone. It is hermetically sealed by a cover *b*, which carries a short pipe T fitted with a cock *c* for introducing the tar. The pipe R' serves for conveying the acetone from a montipus J. From the lowest point of the mixing vessel M a pipe R" that can be closed by a cock H' leads to the crystallizing apparatus K, which is fitted with a conveyer worm and is cooled by a cooling liquor in the jacket surrounding the conveyor, shown in the drawing. The tar-acetone mixture passes through this pipe R" from the mixing vessel to the crystallizing apparatus, and from this vessel the cooled mass is transferred to the closed vessel G. From the latter the plunger pump P sucks the mass through a pipe *d* that can be closed by means of a cock H" and forces it through the pipe *f* into the filter press F. The latter is fitted with a washing arrangement and is also closed. From the press the liquid under pressure is conveyed through the pipe R'" to the distilling apparatus D. When the filter press is full, the suction pipe *d* is closed by the cock H", whereupon pure acetone is supplied to the pump through a T-piece having a cock H'". After washing out the tar oils the acetone still contained in the pressed paraffin cakes is displaced by water. This is made possible by the fact that acetone will mix with water in any proportion. The washing water containing acetone is conveyed to a second distilling apparatus for recovering the acetone through the branch pipe R''''.

The acetone which distils off from the distilling apparatus D is condensed in the cooler K' from which it passes to the vessel J from which it can be conveyed through the pipe R' directly back again to the mixing vessel M, so that the main quantity of the acetone travels in a closed circuit, without coming in contact with the outer air and that there is thus no possibility of losses occurring through evaporation.

In place of the plunger pump another circulating pump can be used, for instance an air compressor, which acts on the surface of the liquid in the mixing vessel M.

Having now particularly described and ascertained the nature of my said invention and in what manner the same is to be performed, I declare that what I claim is:—

1. A process for obtaining paraffin and highly viscous lubricating oils from crude bituminous tar which comprises treating the said crude bituminous tar in the cold state with acetone to form a solution, filtering off the paraffin which separates off from said solution, dissolving the paraffin in an indifferent solvent, treating the solution thus obtained with concentrated sulphuric acid, removing the acid resins and the sulphuric acid from the solution, and precipitating the paraffin from the solution by means of acetone.

2. A process of obtaining paraffin and highly viscous lubricating oils from crude bituminous tar containing paraffin which comprises treating the said crude bituminous tar with acetone to form a solution, filtering the solution to remove the paraffin which separates out from the said solution, washing the filtrate therefrom with a suitable solvent to remove creosote and similar oxygen containing bodies therefrom, and heating the washed residue in a vacuum at a temperature below 250° C. to separate the more volatile oils therefrom.

3. A process of obtaining paraffin and highly viscous lubricating oils from crude bituminous tar containing paraffin which comprises treating the said crude bituminous tar in a closed circuit with acetone recovered from a previous similar treatment, to form a solution, filtering the solution to remove the paraffin which separates out from said solution, washing the filtrate therefrom with a suitable solvent to remove creosote and similar oxygen containing bodies therefrom, distilling the acetone containing solutions to recover the acetone without exposure to the air, and retaining the acetone so recovered to treat the next batch of crude bituminous tar in the same closed circuit.

In testimony whereof I have signed my name to this specification in the presence of two subscribing witnesses.

ERNST ERDMANN.

Witnesses:
 WALTER KROUSE,
 MARTHA KROUSE, geb. KLITZSCH-MÜLLER.